Feb. 21, 1967 — S. P. DE GENNARO ET AL — 3,305,216
CAMPER JACKING APPARATUS
Filed Aug. 30, 1965 — 2 Sheets-Sheet 1
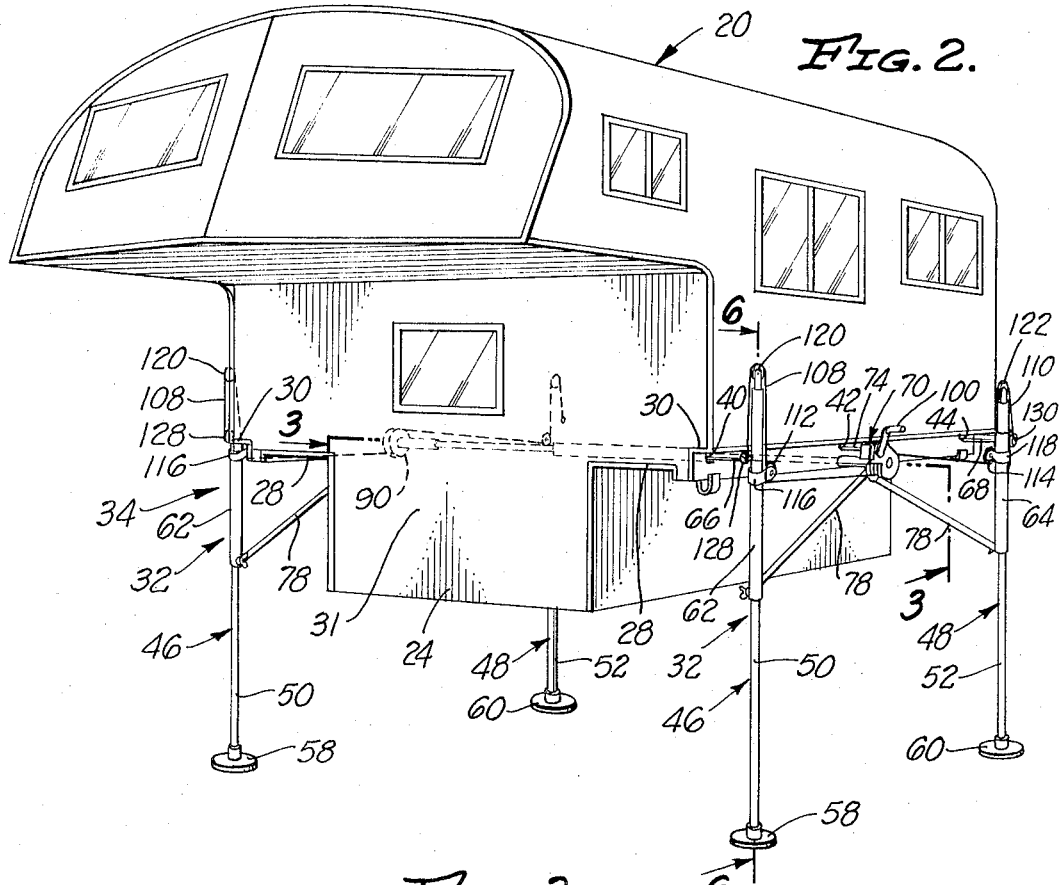
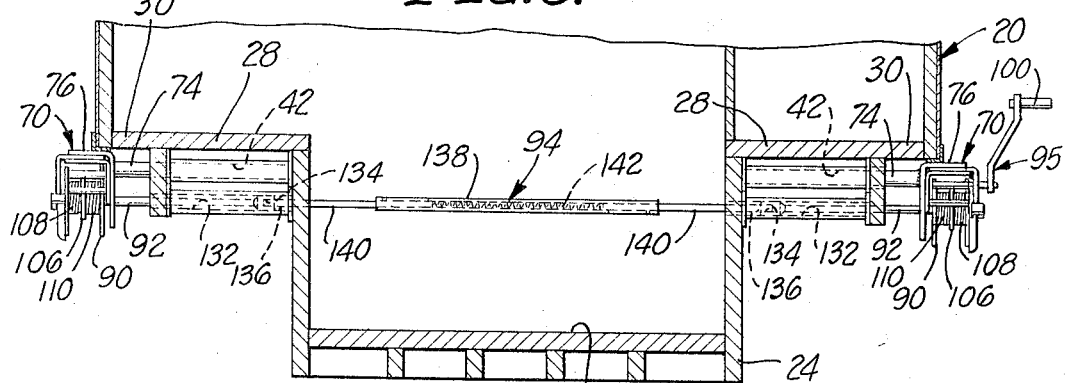
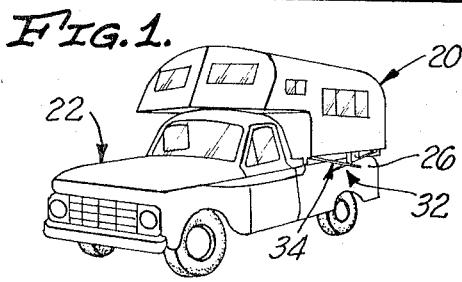
INVENTORS
STEVE P. DE GENNARO,
STEVE J. DE GENNARO
BY THEIR ATTORNEYS
HARRIS, KIECH, RUSSELL & KERN Feb. 21, 1967  S. P. DE GENNARO ET AL  3,305,216
CAMPER JACKING APPARATUS
Filed Aug. 30, 1965  2 Sheets-Sheet 2
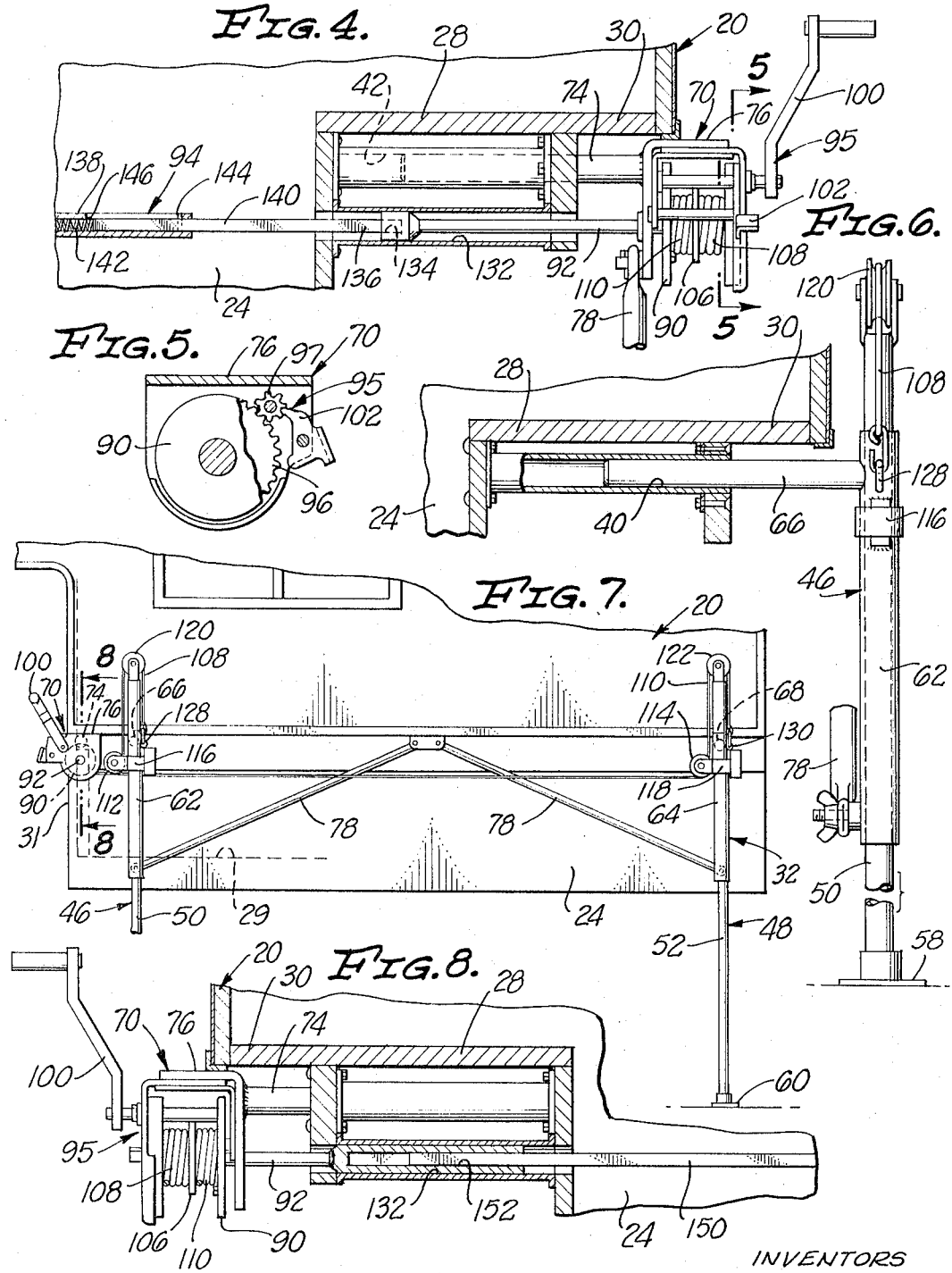
INVENTORS
STEVE P. DE GENNARO,
STEVE J. DE GENNARO
BY THEIR ATTORNEYS
HARRIS, KIECH, RUSSELL & KERN

United States Patent Office 3,305,216
Patented Feb. 21, 1967

3,305,216
CAMPER JACKING APPARATUS
Steve P. De Gennaro, 1448 E. Forest Drive, Anaheim, Calif. 92804, and Steve J. De Gennaro, 5910 Victoria Ave., Riverside, Calif. 92506
Filed Aug. 30, 1965, Ser. No. 483,504
7 Claims. (Cl. 254—47)

The present invention relates in general to campers, or camper coaches, which are mountable on pickup trucks, or other vehicles, and, more particularly, to a jacking apparatus, comprising two jacking means respectively mounted on opposite sides of the camper and engageable with the ground on opposite sides thereof, for elevating the camper clear of the bed of the truck in de-mounting the camper, and for lowering the camper onto the bed of the truck in mounting the camper thereon.

Still more particularly, the invention provides improvements on that disclosed and claimed in our co-pending patent application Serial No. 426,995 filed January 21, 1965, now Patent No. 3,248,083, issued April 26, 1966.

The primary object of the invention is to provide a jacking apparatus which includes two actuating means, respectively mounted on opposite sides of the camper, for respectively actuating the two jacking means, and which includes means for interconnecting the two actuating means to achieve simultaneous actuation of the two jacking means, whereby both sides of the camper are raised and lowered uniformly.

Conventional campers for use on pickup trucks are provided a central rear entrance and a central walkway extending forwardly from such rear entrance toward the front of the camper. An important object of the invention is to provide means for interconnecting the two actuating means on such a camper which spans the walkway in the camper when the jacking apparatus is in use, and which is removable when the jacking apparatus is not in use to leave the walkway unobstructed.

Another object of the invention is to provide a removable connecting means for the two actuating means which comprises resiliently extensible and contractible shaft means telescopically connectible to stub shafts of the two actuating means, the two stub shafts being accessible from the sides of the walkway. A related object is to provide such a shaft means comprising telescopically interconnected shafts and spring means biasing same axially apart.

A further object of the invention is to provide a jacking apparatus wherein each jacking means comprises front and rear jacks, and wherein each actuating means comprises an actuating device located between and connected to the corresponding front and rear jacks, the removable connecting means for the two actuating devices being adapted to span the walkway intermediate its forward and rearward ends.

Still another object is to provide a jacking apparatus wherein the actuating devices respectively include spool means interconnectible by the removable connecting means, and wherein one of the actuating devices includes winch means connected to the corresponding spool means.

Another important object of the invention is to provide a jacking apparatus wherein the two actuating devices are mounted on the camper forwardly of the front jacks, and wherein the connecting means for the two actuating devices extends across the camper at or forwardly of the front end of the walkway. With this construction, the connecting means does not obstruct the walkway at any time, and may be left in place permanently.

The foregoing objects, advantages, features and results of the present invention, together with various other objects, advantages, features and results thereof which will be evident to those skilled in the camper art in the light of this disclosure, may be achieved with the exemplary embodiments of the invention described in detail hereinafter and illustrated in the accompanying drawings, in which:

FIG. 1 is a small-scale perspective view showing a pickup truck having mounted thereon a camper equipped with the jacking apparatus of the invention, such jacking apparatus being shown retracted;

FIG. 2 is an enlarged, perspective view of the camper and jacking apparatus with the jacking apparatus extended to support the camper, and with the pickup truck removed;

FIG. 3 is an enlarged, fragmentary sectional view taken as indicated by the arrowed line 3—3 of FIG. 2;

FIG. 4 is a further enlarged, fragmentary sectional view duplicating a portion of FIG. 3;

FIG. 5 is a sectional view taken as indicated by the arrowed line 5—5 of FIG. 4;

FIG. 6 is an enlarged, fragmentary sectional view taken as indicated by the arrowed line 6—6 of FIG. 2;

FIG. 7 is a fragmentary side elevational view, corresponding generally to FIG. 2, illustrating another embodiment of the invention; and FIG. 8 is an enlarged, fragmentary sectional view taken as indicated by the arrowed line 8—8 of FIG. 7.

Referring to FIGS. 1 to 6 of the drawings, the numeral 20 designates a camper or camper coach mountable on a pickup truck 22, or similar vehicle. As is conventional, the camper 20 has a lower section 24, FIG. 2, of reduced width which fits into the bed of the truck 22 between the sides 26 thereof and which rests on the truck bed. As is also conventional, the camper 22 has along its sides laterally-extending overhangs 28 which project outwardly over the sides 26 of the truck bed. Additionally, the camper 20 is provided with a central rear entrance, not shown, and a central longitudinal walkway 29, FIG. 3, which extends forwardly from the rear entrance toward the front 31 of the camper.

The camper 20 is also provided along its sides with additional laterally-extending overhangs 30, located outwardly of the overhangs 28, respectively adapted to receive thereunder jacking means or devices 32 constituting a jacking apparatus 34 of the invention for raising and lowering the camper in mounting it on and removing it from the truck 22. The two jacking devices 32 are identical so that, for convenience, only one of them will be considered in detail. Also, the two jacking devices 32 are similar to those disclosed in our aforementioned co-pending application, which is incorporated herein by reference for a detailed disclosure.

Each jacking device 32 includes laterally-extending front, intermediate and rear pivot elements in the form of sockets 40, 42 and 44 mounted on the corresponding side of the camper 20 and having open outer ends under the corresponding outer overhang 30. Each jacking device 32 also comprises front and rear jacks 46 and 48 respectively including front and rear supports 50 and 52 having lower ends engageable with the ground and adapted to be equipped with removable feet 58 and 60 to provide increased bearing surfaces if necessary. The front and rear jacks 46 and 48 also include front and rear sleeves 62 and 64 respectively slidable longitudinally of the front and rear supports 50 and 52. These sleeves respectively include laterally-extending front and rear pivot elements in the form of shafts 66 and 68 axially inserted into the respective front and rear sockets 40 and 44. The shafts 66 and 68 are pivotable within the sockets 40 and 44, and are movable axially thereof, to permit upward pivoting and inward movement of the front and rear jacks 46 and 48 into retracted positions under the corresponding overhang 30, as suggested in FIG. 1 of the drawings, and as disclosed in more detail in our aforementioned co-pending application.

Each jacking device 32 comprises an actuating means for sliding the corresponding front and rear sleeves 62 and 64 longitudinally of the corresponding front and rear supports 50 and 52 in raising or lowering the camper 20. Each such actuating means comprises an actuating device 70 having a frame which includes a laterally-extending intermediate pivot element in the form of a shaft 74 axially inserted or plugged into the corresponding intermediate socket 42. The intermediate shaft 74 is movable axially of the corresponding socket 42 to permit inward movement of the corresponding actuating device 70 into a retracted position under the corresponding overhang 30.

Rotation of each actuating device 70 about the axis of the corresponding socket 42 is prevented by engagement of a flat upper surface 76 of its frame with the under side of the corresponding overhang 30, as illustrated in FIG. 3 of the drawings, which shows the actuating devices in their extended positions. When the front and rear jacks 46 and 48 and the actuating devices 70 of each jacking device 32 are in their extended positions, the actuating device and the jacks are interconnected by diagonal braces 78 which also serve to prevent rotation of the actuating device about the axis of its socket 42, and to brace the front and rear jacks. The braces 78 are detachably connected to the lower ends of the front and rear sleeves 62 and 64 for purposes of retracting the jacking devices 32 upwardly under the overhangs 30, as more fully disclosed in our aforementioned co-pending application.

Each actuating device 70 includes a spool means comprising a rotatable reel 90 mounted on a stub shaft 92 extending transversely of the camper 20 and carried by the frame of the corresponding actuating device. The two stub shafts 92 are capable of being interconnected by a removable connecting means 94, to be described in detail hereinafter, which is adapted to span the walkway 29 when the jacking apparatus 34 is in operation. When the jacking apparatus is not in operation, the connecting means 94 is removed, as will be described, to leave the walkway 29 unobstructed.

One of the actuating devices 70 includes a winch or winch means 95 comprising a driven gear 96 connected to the corresponding reel 90 and driven by a smaller, driving gear 97 to which an actuating handle 100 is connected. The driving gear 97 also acts as a rachet wheel and is engageable by a pawl 102 suitably spring biased into engagement with the driving gear. The pawl 102 is so oriented that when the winch 95 is actuated in a direction to elevate the camper 20, it rides over the teeth on the driving gear 97. In order to lower the camper, it is necessary to disengage the pawl 102 from the driving gear 97 manually. For a more detailed description of the winch 95, reference is hereby made to our aforementioned co-pending application.

As will be apparent, since the stub shafts 92 connected to the two reels 90 are interconnected by the removable connecting means 94 when the jacking apparatus 34 is in operation, the single winch 95 operates both actuating devices 70 simultaneously to achieve simultaneous raising or lowering of both sides of the camper 20, which is an important feature.

The reel 90 of each actuating device 70 is devided into two parts by an intermediate partition 106. The inner ends of front and rear cables 108 and 110 are secured to the reel 90 within the respective compartments thereof and are adapted to be wound on the reel within such compartments. The front and rear cables 108 and 110 are adapted to be trained around front and rear guide pulleys 112 and 114 respectively carried by collars 116 and 118 on the front and rear sleeves 62 and 64. The collars 116 and 118 are fixed against axial movement relative to the corresponding sleeves 62 and 64, but are rotatable about such sleeves to permit the guide pulleys 112 and 114 to align themselves with the cables 108 and 110 properly. From the guide pulleys 112 and 114, the cables 108 and 110 are adapted to extend upwardly and over front and rear guide pulleys 120 and 122 respectively mounted on the upper ends of the front and rear supports 50 and 52. The outer ends of the cables 108 and 110 are suitably connected to eyes 128 and 130 on the respective sleeves 62 and 64 substantially opposite the shafts 66 and 68 thereon.

When the winch 95 is operated with the reels 90 interconnected by the removable connecting means 94, and with the cables 108 and 110 trained around the guide pulleys 112, 114, 120 and 122 and connected to the eyes 128 and 130, the camper 20 may be raised and lowered in removing it from or mounting it on the truck 22. As will be apparent, rotation of the driving gear 97 of the winch 95 in one direction (counterclockwise as viewed in FIG. 5) causes the cables 108 and 110 to move the sleeves 62 and 64 upwardly on the supports 50 and 52, thereby moving the camper 20 upwardly correspondingly. By releasing the pawl 102 and rotating the driving gear 97 in the opposite direction, the sleeves 62 and 64 are moved downwardly by the weight of the camper 20 to permit lowering of the camper. Since the two reels 90 are interconnected by the connecting means 94, the single winch 95 raises or lowers the two sides of the camper simultaneously.

The jacking devices 32 may be moved inwardly and upwardly into retracted positions under the overhangs 30, as suggested in FIG. 1 of the drawings. The manner in which this is accomplished is disclosed in detail in our aforementioned co-pending application.

Considering the removable connecting means 94 for the stub shafts 92 in more detail, and referring particularly to FIGS. 3 and 4 of the drawings, the stub shafts 92 extend into and have enlarged inner ends journalled in sockets 132 paralleling the sockets 42 for the shafts 74 of the actuating devices 70. The sockets 132 have the form of tubes communicating at their inner ends with, and extending through the sides of, the walkway 29. Thus, the inner ends of the stub shafts 92 are accessible from the walkway 29.

The stub shafts 92 are provided in their inner ends with noncircular, preferably square, sockets 134. These sockets receive complementary noncircular ends 136 of the removable connecting means 94 for interconnecting the reels 90 of the two actuating devices 70.

More particularly, the removable connecting means 94 comprises a resiliently extensible and contractible shaft means the ends 136 of which are telescopically connected to the stub shafts 92 by being inserted into the sockets 134 therein. The connecting means 94 may comprise a noncircular, preferably square, central tubular shaft or tube 138 having complementary noncircular, e.g., square shafts 140 telescoped into its ends and into the stub shafts 92. The connecting means 94 comprises spring means 142 biasing the shafts 140 axially outwardly relative to the central tube 138. More particularly, the spring means 142 may comprise a compression coil spring disposed within the central tube 138 and seated against the inner ends of the shafts 140 to maintain their outer ends 136 in the sockets 134 in the stub shafts 92, irrespective of whether the actuating devices 70 are in their extended or retracted positions. To prevent separation of the shafts 140 from the central tube 138, the former may be provided with pins 144 axially movable in longitudinal slots 146 in the central tube.

As will be apparent from the foregoing, the connecting means 94 interconnects the two actuating devices 70 so that the single winch 95 serves to raise and lower both sides of the camper 20 simultaneously. It will be noted that, as best shown in FIG. 3, the connecting means 94 spans the central walkway 29 above the floor thereof when the jacking apparatus 34 is in use. However, once the camper 20 has been mounted on the truck 22, the connecting means 94 may be removed to leave the walkway 29 unobstructed. As will be apparent, this may be accomplished by compressing the spring means 142 to permit withdrawal of the ends 136 of the shafts 140 from the sockets 134 in the stub shafts 92. The pins 144 in the slots 146 prevent separation of the shafts 140 from the central tube 138. Once the connecting means 94 has been removed, it may be stored in any suitable location until needed.

Turning now to FIGS. 7 and 8 of the drawings, the embodiment illustrated therein is similar to the embodiment of FIGS. 1 to 6, the same reference numerals being utilized for corresponding parts. In the embodiment of FIGS. 7 and 8, the actuating devices 70, instead of being located between the front and rear jacks 46 and 48, are located forwardly of the front jacks 46. The two stub shafts 92 of the actuating devices 70 are located adjacent or forwardly of the forward end of the walkway 29 and are connected by a connecting means comprising a noncircular, preferably square, shaft 150 extending across the camper 20. The ends of the shaft 150 are telescoped into complementary sockets 152 in the inner ends of the stub shafts 92. The sockets 152 have axial lengths sufficient to preclude withdrawal of the ends of the shaft 150 therefrom upon outward movement of the actuating devices 70 into their extended positions.

Since the shaft 150 is located adjacent or even forwardly of the front end of the walkway 29, it offers no obstruction to the free use of the walkway. Consequently, the shaft 150 may be left in place at all times, i.e., during normal use of the camper 20, as well as during the operations of mounting it on or removing it from the truck 22.

Although exemplary embodiments of the invention have been disclosed herein for purposes of illustration, it will be understood that various changes, modifications and substitution may be incorporated in such embodiments without departing from the spirit of the invention as defined by the claims which follow.

We claim:

1. In a jacking apparatus for a camper mountable on a vehicle and having a rear entrance and a walkway extending forwardly from said rear entrance toward the front of said camper, the combination of:
   (a) two ground-engageable jacking means respectively mounted on opposite sides of said camper and actuable to raise and lower said camper;
   (b) two actuating means respectively mounted on opposite sides of said camper for actuating said jacking means, respectively; and
   (c) removable connecting means capable of spanning said walkway for interconnecting said actuating means to achieve simultaneous actuation of said jacking means.

2. In a jacking apparatus for a camper mountable on a vehicle and having a rear entrance and a walkway extending forwardly from said rear entrance toward the front of said camper, the combination of:
   (a) two ground-engageable jacking means respectively mounted on opposite sides of said camper and actuable to raise and lower said camper;
   (b) two actuating means respectively mounted on opposite sides of said camper for actuating said jacking means, respectively;
   (c) removable connecting means capable of spanning said walkway for interconnecting said actuating means to achieve simultaneous actuation of said jacking means;
   (d) said actuating means respectively including axially aligned stub shafts oriented transversely of said walkway; and
   (e) said removable connecting means comprising resiliently extensible and contractible shaft means telescopically connectible to said stub shafts.

3. In a jacking apparatus for a camper mountable on a vehicle and having a rear entrance and a walkway extending forwardly from said rear entrance toward the front of said camper, the combination of:
   (a) two ground-engageable jacking means respectively mounted on opposite sides of said camper and actuable to raise and lower said camper;
   (b) two actuating means respectively mounted on opposite sides of said camper for actuating said jacking means, respectively;
   (c) removable connecting means capable of spanning said walkway for interconnecting said actuating means to achieve simultaneous actuation of said jacking means;
   (d) said actuating means respectively including axially aligned stub shafts oriented transversely of said walkway;
   (e) said removable connecting means comprising resiliently extensible and contractible shaft means telescopically connectible to said stub shafts; and
   (f) said shaft means including telescopically interconnected shafts and spring means biasing same axially apart.

4. In a jacking apparatus for a camper mountable on a vehicle and having a rear entrance and a walkway extending forwardly from said rear entrance toward the front of said camper, the combination of:
   (a) two ground-engageable jacking means respectively mounted on opposite sides of said camper and actuable to raise and lower said camper and each including front and rear jacks;
   (b) two actuating means respectively mounted on opposite sides of said camper for actuating said jacking means, respectively;
   (c) each of said actuating means comprising an actuating device located between and connected to the corresponding front and rear jacks; and
   (d) removable connecting means capable of spanning said walkway for interconnecting said actuating devices to achieve simultaneous actuation of said jacking means.

5. In a jacking apparatus for a camper mountable on a vehicle and having a rear entrance and a walkway extending forwardly from said rear entrance toward the front of said camper, the combination of:
   (a) two ground-engageable jacking means respectively mounted on opposite sides of said camper and actuable to raise and lower said camper and each including front and rear jacks;
   (b) two actuating means respectively mounted on opposite sides of said camper for actuating said jacking means, respectively;
   (c) each of said actuating means comprising an actuating device located between and connected to the corresponding front and rear jacks;
   (d) removable connecting means capable of spanning said walkway for interconnecting said actuating devices to achieve simultaneous actuation of said jacking means; and
   (e) said actuating devices respectively including spool means interconnectable by said connecting means, and one of them including winch means connected to the corresponding spool means.

6. In a jacking apparatus for a camper mountable on a vehicle and having a rear entrance and a walkway extending forwardly from said rear entrance toward the front of said camper, the combination of:
   (a) two ground-engageable jacking means respectively mounted on opposite sides of said camper and actuable to raise and lower said camper;
   (b) two actuating means respectively mounted on opposite sides of said camper for actuating said jacking means, respectively; and
   (c) connecting means extending across said camper at the forward end of said walkway and interconnecting said actuating means to achieve simultaneous actuation of said jacking means.

7. In a jacking apparatus for a camper mountable on a vehicle and having a rear entrance and a walkway extending forwardlly from said rear entrance toward the front of said camper, the combination of:
- (a) two ground-engageable jacking means respectively mounted on opposite sides of said camper and actuable to raise and lower said camper and each including front and rear jacks;
- (b) two actuating means respectively mounted on opposite sides of said camper for actuating said jacking means, respectively;
- (c) each of said actuating means including an actuating device located forwardly of the corresponding front jack; and
- (d) connecting means extending across said camper at the forward end of said walkway and interconnecting said actuating devices to achieve simultaneous actuation of said jacking means.

References Cited by the Examiner

UNITED STATES PATENTS

| | | | |
|---|---|---|---|
| 1,794,661 | 3/1931 | Williams | 254—86 |
| 1,867,760 | 7/1932 | Richards | 284—86 |
| 2,131,281 | 9/1938 | Harber | 254—86 |
| 3,002,760 | 10/1961 | Lee | 214—515 X |

FOREIGN PATENTS

| | | |
|---|---|---|
| 1,067,324 | 1/1954 | France. |

WILLIAM FELDMAN, *Primary Examiner.*

OTHELL M. SIMPSON, *Examiner.*